United States Patent [19]

Smeulers

[11] 3,764,733

[45] Oct. 9, 1973

[54] CHROMINANCE SIGNAL AMPLIFIER STAGE FOR A COLOUR TELEVISION RECEIVER

[75] Inventor: Wouter Smeulers, Emmasingel, Eindhoven, Netherlands

[73] Assignee: U.S. Philips Corporation, New York, N.Y.

[22] Filed: Apr. 8, 1971

[21] Appl. No.: 132,335

[30] Foreign Application Priority Data

Apr. 28, 1970 Netherlands ....................... 7006143

[52] U.S. Cl. ........................ 178/5.4 SY, 178/5.4 AC

[51] Int. Cl. .......................... H04n 9/46, H04n 9/48

[58] Field of Search ...................... 178/5.4, 5.4 MH, 178/5.4 SD, 5.4 R, 5.4 AC, 5.4 CK, 5.4 SY; 330/30 D, 20

[56] References Cited

UNITED STATES PATENTS

| | | | |
|---|---|---|---|
| 3,586,765 | 6/1971 | Jirka | 178/5.4 CK |
| 3,626,089 | 12/1971 | Cecchin et al. | 178/5.4 AC |
| 3,699,257 | 10/1972 | Harwood et al. | 178/5.4 SY |
| 3,624,275 | 11/1971 | Lunn | 178/5.4 MA |
| 3,595,989 | 7/1971 | Hoke | 178/5.4 SD |
| 3,558,810 | 1/1971 | Cecchin | 178/5.4 SD |

OTHER PUBLICATIONS

"An Integrated Circuit for Chrominance Signal Processing In Color–TV Receivers", IEEE Trans. Broadcast & Television Receivers Vol. BTR 16 No. 3 Aug. 1970 by Gary Kelson pp. 196–202.

*Primary Examiner*—Robert L. Griffin
*Assistant Examiner*—George G. Stellar
*Attorney*—Frank R. Trifari

[57] ABSTRACT

In a chrominance signal amplifier stage of the long-tailed pair type including a current branch circuit and a load resistor in one of the current branches from which a burst signal is obtained, the amplitude of this burst signal is rendered independent of an adjusting or control voltage active on a branch current by including a parallel current branch and blocking current branches not connected to the load resistor.

4 Claims, 2 Drawing Figures

INVENTOR.
WOUTER SMEULERS

BY [signature]
AGENT

INVENTOR.
WOUTER SMEULERS

BY Frank R. Trifari
AGENT

CHROMINANCE SIGNAL AMPLIFIER STAGE FOR A COLOUR TELEVISION RECEIVER

The invention relates to a chrominance signal amplifier stage for a colour television receiver, which chrominance signal amplifier stage comprises a first transistor a control electrode of which is coupled to an input of the amplifier stage and the collector of which is coupled to the emitters of second and third transistors, the collector of the second transistor being connected to a load impedance and to an output of the amplifier stage, while a voltage for influencing an output magnitude of the amplifier stage is applied between the bases of the second and third transistors, a burst handling circuit being coupled to the said output from which the circuit receives a burst signal whose amplitude is independent of the said voltage.

A chrominance signal, amplifier stage of the kind described above is known from U.S. Pat. application Ser. No. 151,585, filed June 9, 1971 in which the collector of the third transistor is coupled through a further impedance to the collector of the second transistor and in which the collector of the third transistor of the third transistor provides a chrominance signal which can be influenced by the voltage between the bases of these transistors. This voltage originates from a contrast adjusting circuit and is combined with a beam current limiting voltage.

However, in this known circuit arrangement the optimum amplification of this stage is not obtained for the burst signal.

An object of the present invention is to provide a chrominance signal amplifier stage which also has a large amplification for the burst signal and has furthermore the advantages of the known amplifier stage and has advantageous properties for certain uses.

According to the invention a chrominance signal amplifier stage of the kind described in the preamble is characterized in that the collector of the first transistor is furthermore coupled to the emitter of a fourth transistor whose collector is connected to the junction of the collector and the load impedance of the second transistor while a control electrode of at least one of the transistors of the group formed by the second, the third and the fourth transistor is coupled to a pulse signal input of the amplifier stage, the collector circuit of the third transistor being independent of that of the second.

Due to this step it is achieved that the amplification for the burst signal is equal to the maximum amplification of the chrominance signal.

Figure 1:
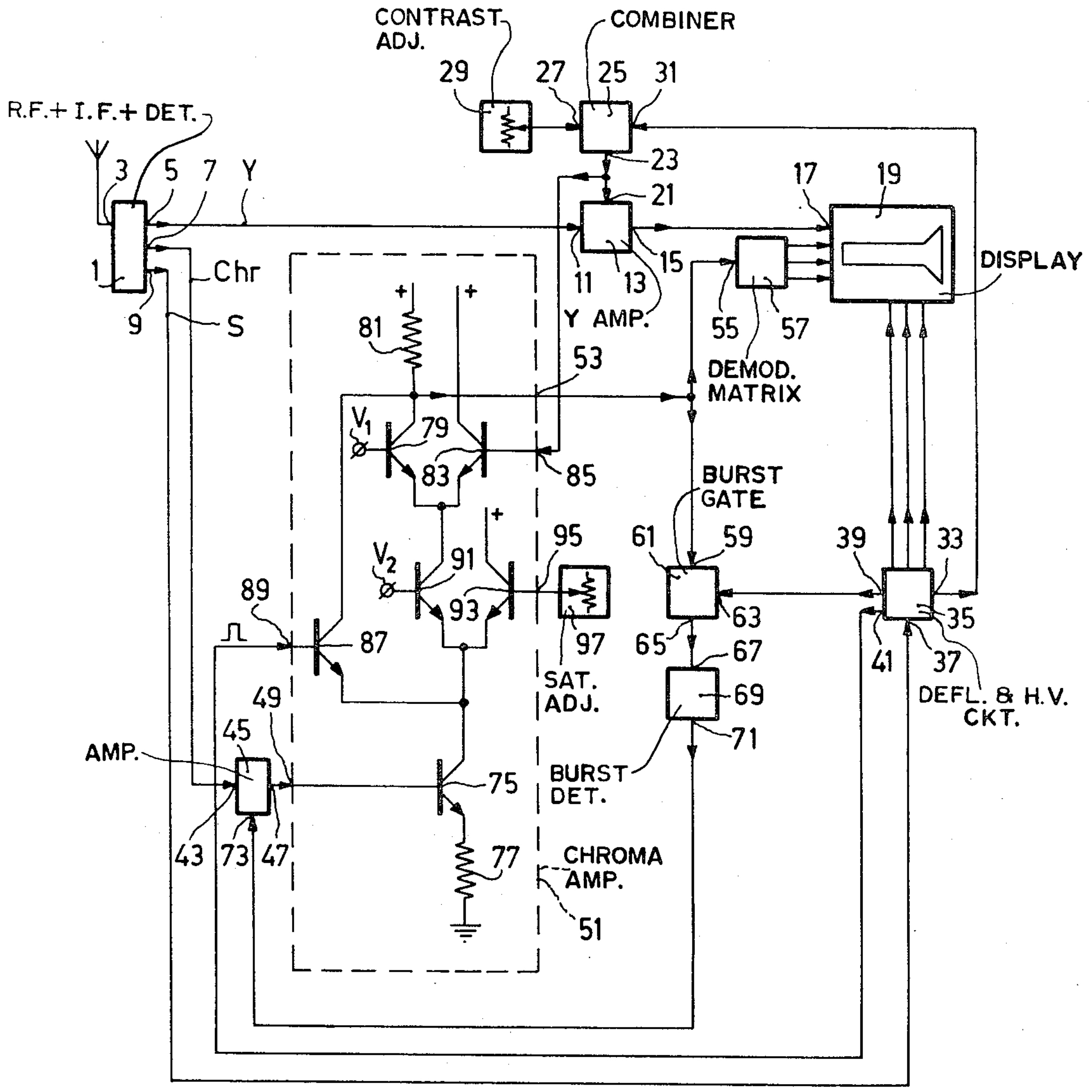
Figure 2:
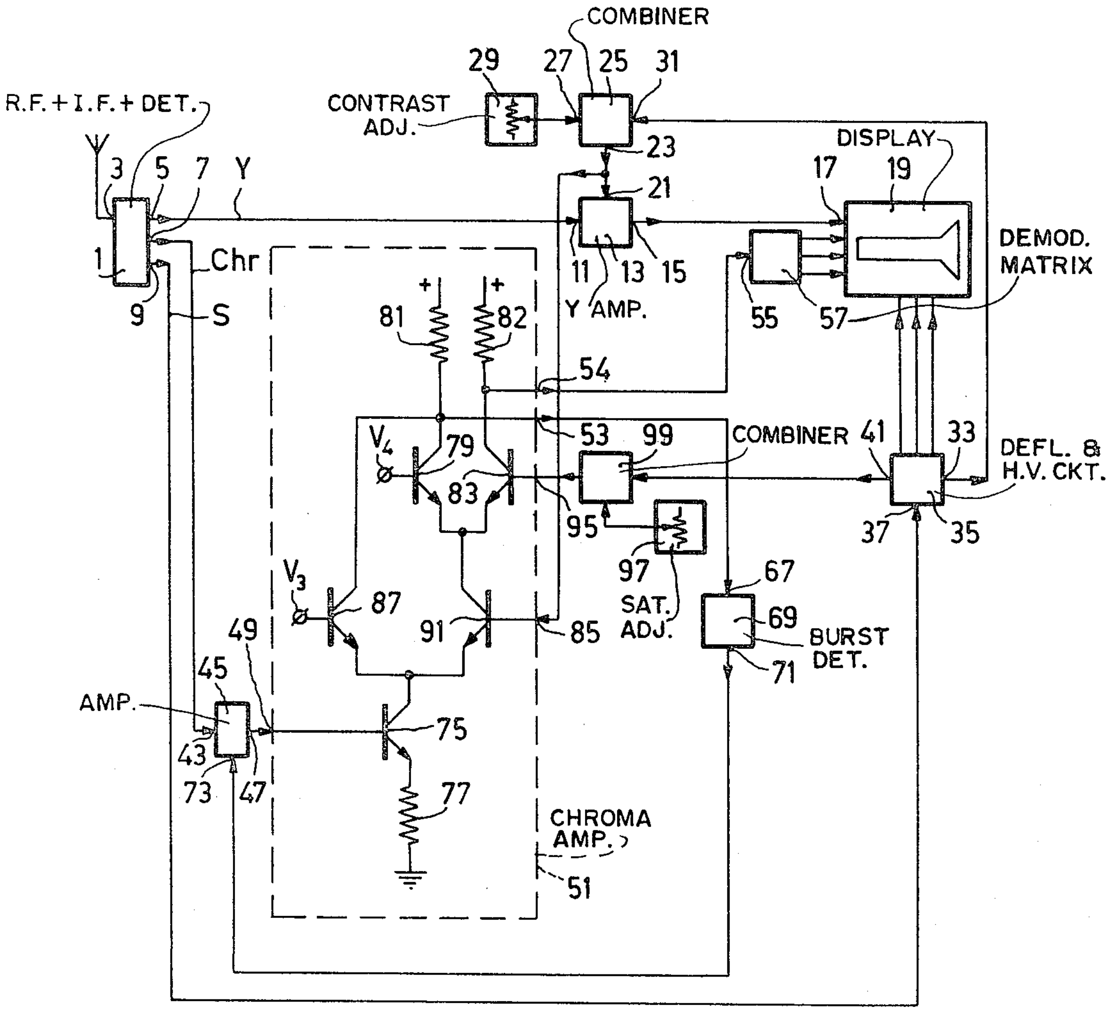

In order that the invention may be readily carried into effect, some embodiments thereof will now be described in detail, by way of example, with reference to the accompanying diagrammatic drawings, in which:

FIG. 1 shows by way of a non-detailed block diagram a colour television receiver including a chrominance signal amplifier stage according to the invention shown by way of a non-detailed principle circuit diagram, FIG. 2 shows by way of a non-detailed block diagram a colour television receiver including a chrominance signal amplifier stage according to the invention shown by way of a non-detailed principle circuit diagram, and also serving as a separator stage for the burst and chrominance signals.

In FIG. 1, an RF, IF and detection section 1 of the receiver has an aerial input 3, and output 5 to which a luminance signal Y is applied, an output 7 to which a chrominance signal Chr is applied and an output 9 to which a synchronizing signal S is applied.

The output 5 of the section 1 is connected to an input 11 of a luminance signal amplifier 13. An output 15 of the luminance signal amplifier 13 is connected to an input 17 of a picture display section 19. Furthermore a control signal input 21 of the luminance signal amplifier 13 is connected to an output 23 of a combination circuit 25. An input 27 of this combination circuit 25 is connected to a contrast adjusting circuit 29 and an input 31 is connected to an output 33 of a deflection current and EHT generator 35 an input 37 of which is connected to the output 9 of the section 1.

The generator 35 provides a beam current limiting voltage at the output 33. Furthermore, this generator applies vertical and horizontal deflection currents to the picture display section 19 and pulses to two outputs 39 and 41 which will be further referred to hereinafter.

The chrominance signal output 7 of the section 1 is connected to an input 43 of an amplifier 45 an output 47 of which is connected to an input 49 of a chrominance signal amplifier stage 51 according to the invention.

The chrominance signal amplifier stage 51 has an output 53 which is connected to an input 55 of a demodulation and matrix circuit 57 and to an input 59 of a burst gate 61.

The burst gate 61 has an input 63 which is connected to the output 39 of the generator 35, and to which a gating pulse is applied by this generator. During the occurrence of the gating pulse the burst gate 61 conducts and applies a burst signal to an output 65. The output 65 is connected to an input 67 of a detector 69 which converts a burst signal passed during the occurrence of a gating pulse into a direct voltage which appears at an output 71. The output 71 is connected to a control signal input 73 of the amplifier 45, so that a control loop is present which attempts to maintain the amplitude of the burst at the output 53 of the amplifier stage 51 constant.

The chrominance signal amplifier stage 51 comprises a first npn-transistor 75 whose base is connected to the input 49 and whose emitter is connected to earth through a resistor 77. The output 53 of the chrominance signal amplifier stage 51 is connected to the collector of a second npn-transistor 79, which collector is furthermore connected through a load resistor 81 to a positive voltage. The emitter of the second transistor is connected to that of a third npn-transistor 83. The base of the second transistor 79 is connected to a voltage $V_1$, that of the third transistor 83 is connected to an adjusting signal input 85 of the stage 51. The adjusting signal input 85 is connected to the output 23 of the combination circuit 25 and receives a voltage which is dependent on the contrast adjustment and the beam current.

The collector of the third transistor 83 is connected to a positive supply voltage independently of that of the second transistor 79.

The collector of the second transistor 79 is furthermore connected to that of a fourth npn-transistor 87 whose emitter is connected to the collector of the first transistor 75 and whose base is connected to an input 89 which is connected to the output 41 of the generator 35. A positive pulse is applied to this input 89 every time during the line flyback period.

A fifth npn-transistor 91 is arranged between the collector of the first transistor 75 and the emitter of the second transistor 79. Its emitter is connected to the collector of the first transistor 75 and its collector is connected to the emitter of the second transistor 79. The base of the fifth transistor 91 is connected to a reference voltage $V_2$.

The collector of the first transistor 75 and the emitter of the fifth transistor 91 are furthermore connected to the emitter of a sixth npn-transistor 93 whose collector is connected to a positive supply voltage independently of that of the second transistor and whose base is connected to an input 95 which is connected to a saturation adjusting circuit 97.

The operation of the chrominance signal amplifier stage 51 is as follows. A chrominance signal applied to the base of the first transistor 75 is provided in an amplified form by the collector. During the occurrence of the positive pulse at the base of the fourth transistor 87 this transistor is conducting and the fifth and sixth transistors 91 and 93 are cut off. The entire collector current of the first transistor 75 is then passed through the fourth transistor 87 to the load resistor 81.

During the line scan period the voltage at the base of the fourth transistor is such that this transistor is cut off. The collector current of the first transistor 75 is then split up for the fifth and sixth transistors 91 and 93 in a ratio which is dependent on the voltage difference between the bases of these transistors and hence on the adjustment of the saturation adjusting circuit 97.

The portion of the current flowing through the fifth transistor 91 is once more split up for the second and third transistors 79 and 83 dependent on the voltage difference between the bases of these transistors and hence on the contrast adjustment 29 and the beam current limiting voltage.

Hence, a burst voltage is is alternately produced across the load resistor 81, which burst voltage is independent of the adjustments of contrast and saturation and a chrominance signal voltage which is dependent thereon. The ratio between these voltages is furthermore independent of the gain control voltage which is applied to the input 73 of the amplifier 45.

It will be evident that the saturation adjustment may be optionally omitted. The fifth and sixth transistors 91 and 93 are then omitted and the emitters of the second and third transistors 79 and 83 are then connected directly to the collector of the first transistor 75. Alternatively, the adjustments may be optionally interchanged.

Furthermore, it is possible to omit the amplifier 45 and to include a seventh transistor, for example, between the collector of the first transistor 75 and the emitters of the fourth, fifth and sixth transistors 87, 91 and 93, the emitter of the seventh transistor being connected to the collector of the first transistor 75 and the collector being connected to the emitters of the fourth, fifth and sixth transistors 87, 91 and 93.

The collector of the first transistor is then furthermore connected to the emitter of an eighth transistor whose collector is connected to a positive supply voltage independently of that of the other transistor and in which the automatic gain control voltage is rendered active between the bases of these seventh and eighth transistors.

Optionally a direct current compensation circuit may of course be added for each adjusting level of the amplifier stage 51 or the various levels for the entire stage may be formed in push-pull configuration.

Furthermore, the bias voltages may alternatively be applied in different manners to the corresponding adjusting level, for example, to the base of the other of a pair of transistors or with opposite variation to the bases of both transistors of one pair.

The circuit arrangement is eminently suitable for use in integrated circuits.

In FIG. 2 corresponding components are denoted by the same reference numerals as those in FIG. 1. Consequently, for the description of these components reference is made to FIG. 1.

The circuit arrangement of FIG. 2 is distinguished from that of FIG. 1 by the following features.

A pulse signal originating from the output 41 of the generator 35 is applied to the base of the third transistor 83 through a combination circuit 99 in which it is combined with a direct voltage originating from the saturation adjusting circuit 97.

The collector of the third transistor 83 is connected to the positive supply voltage through a load resistor 82 and is furthermore connected to an output 54 which is connected to the input 55 of the demodulation and matrix circuit 57.

The output 53 is then connected directly to the input 67 of the detector 69 without the interposition of a burst gate (61 in FIG. 1).

Furthermore, the input 85 is connected to the base of the fifth transistor 91 and there is no sixth transistor. (93 in FIG. 1).

The bases of the fourth transistor 87 and the second transistor 79 are connected to voltages $V_3$ and $V_4$, respectively.

The contrast adjusting voltage at the input 85 exerts influence on the current distribution between the fourth and fifth transistors 87 and 91 as a result of the voltage difference between the bases of these transistors which difference is influenced by this voltage.

Of the portion of the current flowing through the fifth transistor 91, another portion may flow through the third transistor 83 to the load resistor 82 thereof. This portion and hence the saturation can be adjusted by means of the voltage originating from the saturation adjusting circuit 97.

However, during the occurrence of the burst signal the third transistor 83 is cut off as a result of the pulse signal applied between the bases of the second and third transistors and originating from the output 41 of the generator 35 and the portion of the current applied through the fifth transistor 91 flows through the second transistor 79 to the load resistor 81 thereof. Thus, the entire current provided by the first transistor 75 always flows independently of the contrast or saturation adjustment through the load resistor 81 during the occurrence of the burst signal.

The amplifier stage 51 serves in this case also as a separator stage for the picture content portion and the burst portion of the chrominance signal.

The possibilities of variation with reference to the embodiment of FIG. 1 also apply in a corresponding manner to the stage described above.

In one embodiment of the entire stage in a push-pull configuration the burst and chrominance signals are obtained in a balanced form, so that when using differential amplifiers direct current pulses which occur as a result of the pulse signal can be suppressed (common mode rejection) at the inputs of the demodulation and matrix circuit 57 and the detector 69.

It will be evident that the pulse signal may alternatively be applied to the base of the second transistor 79 and then with opposite polarity or partially to the second and partially to the third transistors 79 and 83, respectively. One transistor or a combination of the second, third and fourth transistors (87, 97, 83) may be controlled by a pulse signal so as to achieve the desired effect. In the second embodiment the fifth transistor 91 might also be controlled by a pulse signal. This control then acts on the fourth transistor 87 as a result of the coupling of the emitters of these transistors. In the first embodiment the third and sixth transistors instead of the fourth transistor might be controlled by a pulse signal of opposite polarity.

What is claimed is:

1. A circuit for amplifying a composite signal having chrominance portions and color burst portions, said circuit comprising a first transistor having a control electrode for receiving said composite signal, emitter, and collector electrodes; a second transistor having an emitter coupled to said first transistor collector electrode, and having base, and collector electrodes; a first load impedance coupled to said second transistor collector electrode; a third transistor having a base and collector electrodes, and an emitter coupled to said second transistor emitter electrode; means for applying an amplifier gain control signal between said second and third transistor bases; a fourth transistor having a base electrode, an emitter electrode coupled to said first transistor collector electrode, and a collector electrode coupled to said second transistor collector; and means for providing a pulse signal to the base of one of said second, third or fourth transistors; whereby said second and third transistor collector currents are indepen-dent and said burst is derivable from said load impedance and has an amplitude that is the substantially the maximum possible for said circuit and is independent of the chrominance amplitude.

2. A circuit as claimed in claim 1 further comprising a fifth transistor having a base, an emitter coupled to said first transistor collector, and a collector coupled to said second and third transistor emitters; a sixth transistor having an emitter coupled to said first transistor collector, a base, and a collector; and means for applying a control voltage to said fifth and sixth transistor bases; whereby said sixth transistor collector current is independent of said second and fifth transistor collector current.

3. A circuit as claimed in claim 1 further comprising a second load impedance coupled to said third transistor collector, said second load impedance being adapted to receive a supply voltage, and a chrominance handling circuit coupled to said second load impedance.

4. A circuit as claimed in claim 1 further comprising a fifth transistor having emitter, base, and collector electrodes, wherein said first transistor collector is coupled to said fourth and fifth transistor emitters, said fifth transistor collector is coupled to said second and third transistor emitters, and further comprising means for applying a control voltage said fourth and fifth transistor bases.

* * * * *